US008534631B2

(12) United States Patent
Shirey

(10) Patent No.: US 8,534,631 B2
(45) Date of Patent: Sep. 17, 2013

(54) TRAILER JACK SUPPORT BLOCK

(76) Inventor: Chad W. Shirey, Warriors Mark, PA (US)

( * ) Notice: Subject to any disclaimer, the term of this patent is extended or adjusted under 35 U.S.C. 154(b) by 0 days.

(21) Appl. No.: 13/351,115

(22) Filed: Jan. 16, 2012

(65) Prior Publication Data

US 2013/0181105 A1    Jul. 18, 2013

(51) Int. Cl.
*A47B 91/00* (2006.01)
*A47B 95/00* (2006.01)
*A47G 29/00* (2006.01)

(52) U.S. Cl.
USPC ............. 248/346.03; 248/346.01; 280/477

(58) Field of Classification Search
USPC ......... 248/121, 188.2, 188.8, 351; 269/131, 269/311, 314, 313; 254/418; 52/169.1–170; D25/102–118, 136; 224/493, 572, 518, 519
See application file for complete search history.

(56) References Cited

U.S. PATENT DOCUMENTS

| 1,204,734 | A | * | 11/1916 | Benson | 269/97 |
|---|---|---|---|---|---|
| 2,264,483 | A | * | 12/1941 | Pousman et al. | 16/204 |
| 2,372,967 | A | * | 4/1945 | Martin | 410/97 |
| 3,132,447 | A | * | 5/1964 | Hosbein | 52/506.03 |
| D235,570 | S | * | 6/1975 | Barton | D21/499 |
| 3,888,190 | A | * | 6/1975 | Bigge | 410/101 |
| 4,018,015 | A | * | 4/1977 | Swanson | 52/23 |
| 4,103,870 | A | * | 8/1978 | Murakami | 254/88 |
| 4,111,132 | A | * | 9/1978 | Plut | 410/97 |
| 4,537,416 | A | * | 8/1985 | Linaburg | 280/477 |
| 4,548,418 | A | * | 10/1985 | Wendorff | 280/1 |
| 4,911,460 | A | * | 3/1990 | DePaula | 280/478.1 |
| 5,009,444 | A | * | 4/1991 | Williams, Jr. | 280/477 |
| 5,150,911 | A | * | 9/1992 | Williams | 280/502 |
| 5,184,840 | A | * | 2/1993 | Edwards | 280/507 |
| 5,673,464 | A | * | 10/1997 | Whittaker | 24/301 |
| 5,704,582 | A | * | 1/1998 | Golembiewski et al. | 248/500 |
| 6,179,115 | B1 | * | 1/2001 | de Guglielmo et al. | 198/626.1 |
| D452,332 | S | * | 12/2001 | Blomquist et al. | D25/113 |
| D465,855 | S | * | 11/2002 | Risi et al. | D25/113 |
| 6,651,963 | B1 | * | 11/2003 | Kayser et al. | 254/420 |
| 6,715,965 | B2 | * | 4/2004 | Manthei et al. | 405/284 |
| 6,874,745 | B1 | | 4/2005 | Bean | |
| D509,911 | S | * | 9/2005 | Shillingburg | D25/113 |
| 6,953,309 | B1 | * | 10/2005 | Tufts et al. | 405/284 |
| D512,162 | S | * | 11/2005 | Risi | D25/113 |
| 7,305,794 | B1 | * | 12/2007 | Cantrell | 47/41.12 |
| D663,439 | S | * | 7/2012 | Edwards | D25/113 |
| 2009/0033061 | A1 | * | 2/2009 | Hensley | 280/477 |
| 2010/0187489 | A1 | * | 7/2010 | Hebert | 254/420 |

* cited by examiner

*Primary Examiner* — Daniel J Troy
*Assistant Examiner* — Muhammad Ijaz
(74) *Attorney, Agent, or Firm* — Richard C. Litman

(57) ABSTRACT

The trailer jack support block includes a solid rectangular parallelepiped member having surfaces for supporting the lower end of a trailer jack thereon. Attachment chains are provided for securing the support block to the trailer hitch. Grooves are provided on at least two surfaces for retaining the chains therein, if desired.

2 Claims, 3 Drawing Sheets

TRAILER JACK SUPPORT BLOCK

BACKGROUND OF THE INVENTION

1. Field of the Invention

The present invention generally relates to support structure, and particularly to a trailer jack support block for supporting an unhitched trailer jack thereon.

2. Description of the Related Art

When unhitched, it is often desirable to support the trailer jack above the ground, particularly when the trailer is left on unpaved ground. This prevents the jack from engaging the ground and accumulating dirt thereon and possible damage thereto. An elevated position also allows water to drain freely from the jack, thereby retarding rust. Heretofore, such items as logs, concrete blocks and the like have been utilized to support the jack in an elevated position. These items have proven to be less than satisfactory and are often unavailable, in that they may be forgotten and left behind when the trailer is hitched and moved to another location. Retractable wheel apparatus has also been employed as a support for jacks. However these rack and pinion operated devices are relatively expensive and are not especially adapted to small- and medium-sized trailers. An inexpensive, durable trailer jack support having means for attachment to the trailer to prevent loss would certainly be a welcome addition to the art. Thus, a trailer jack support block solving the aforementioned problems is desired.

SUMMARY OF THE INVENTION

The trailer jack support block comprises a solid rectangular member having surfaces for supporting the lower end of a trailer jack thereon. Attachment chains are provided for securing the support block to the trailer hitch. Grooves are provided on at least two surfaces of the block for retaining chains therein, if desired.

Accordingly, the invention presents a support block that is durable, versatile, efficient and easy to use. The invention provides for improved elements thereof in an arrangement for the purposes described that are inexpensive, dependable and fully effective in accomplishing their intended purposes.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
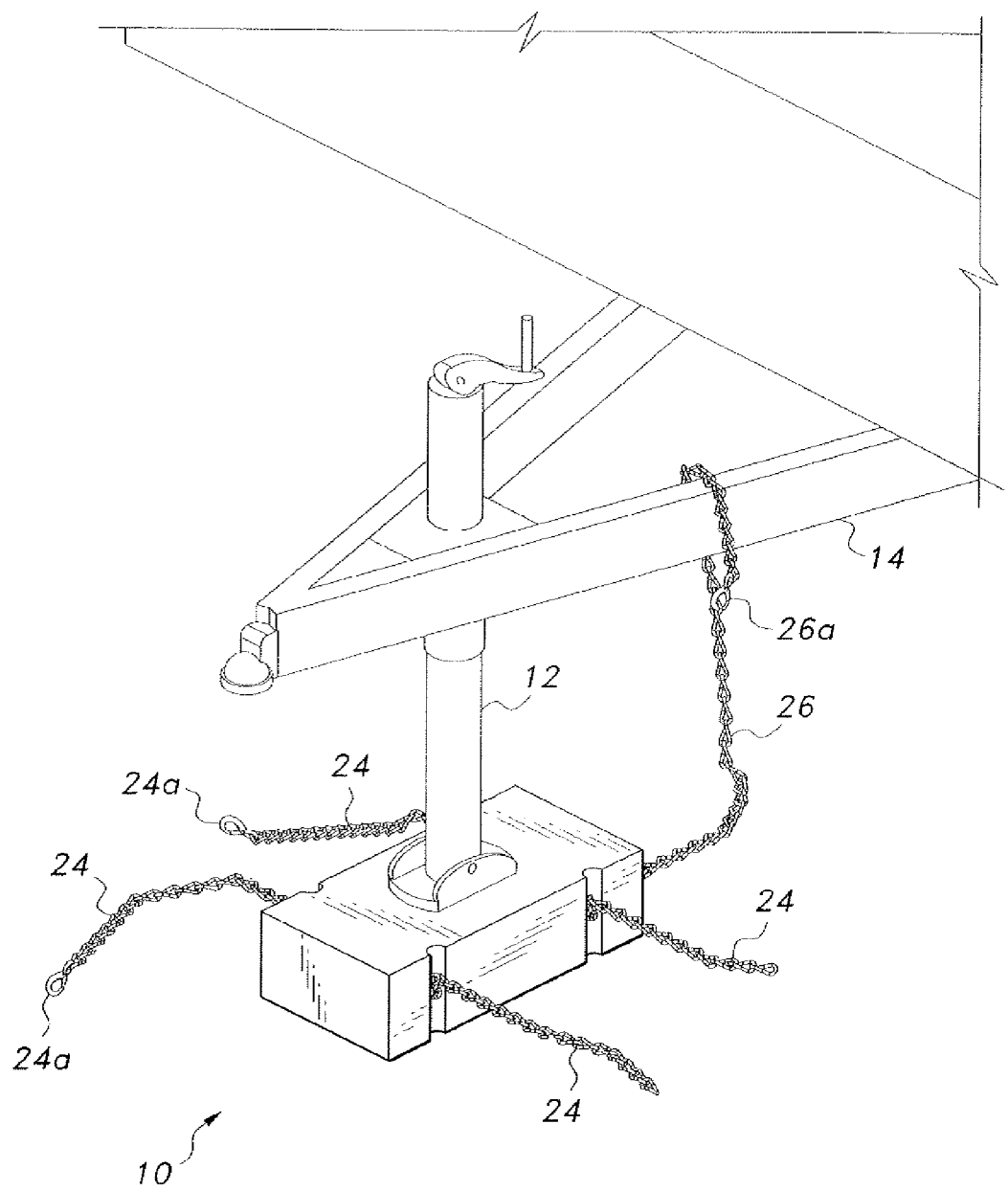
FIG. 1 is an environmental, perspective view of a trailer jack support block according to the present invention.
Figure 2:
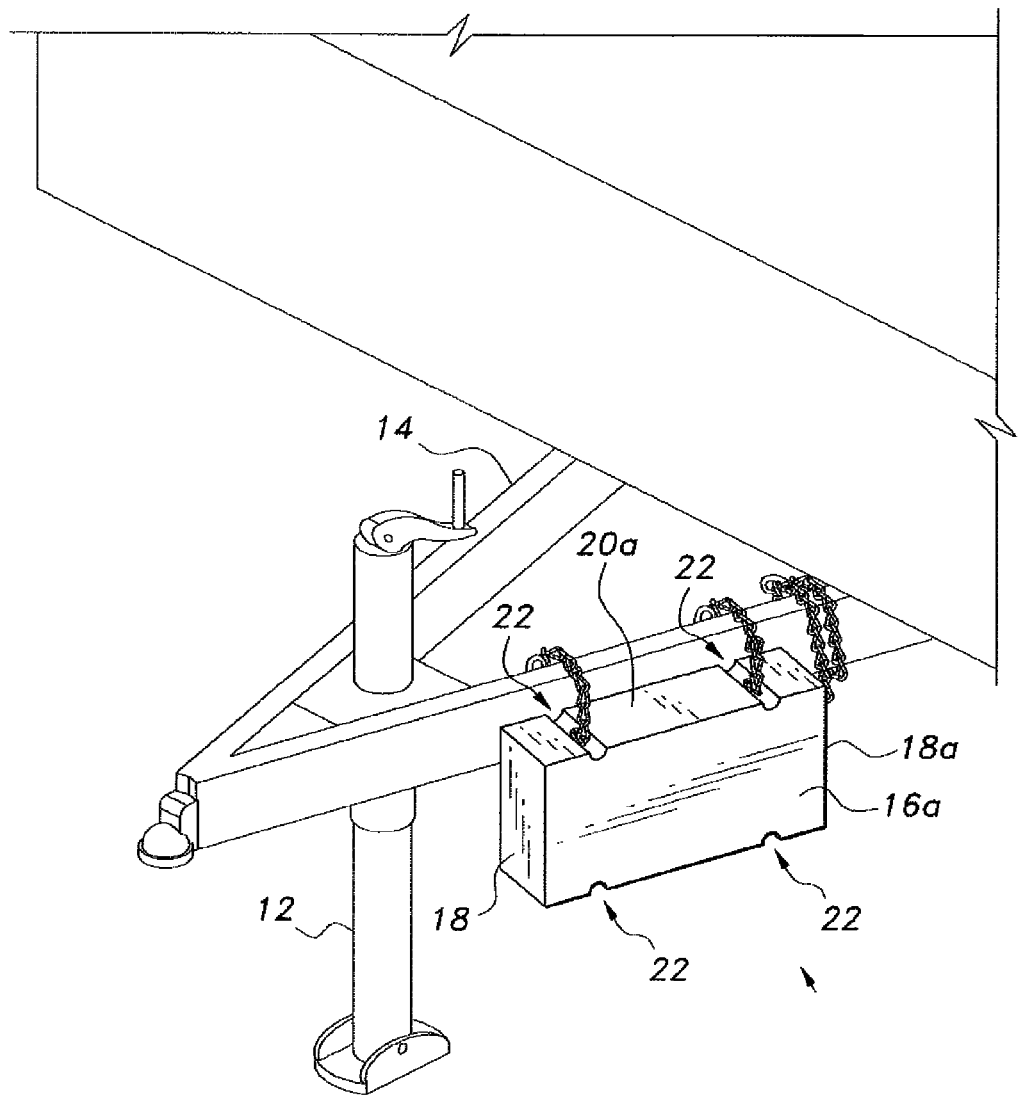
FIG. 2 is an environmental perspective view of the trailer jack support block of FIG. 1, showing the block attached to the trailer hitch frame.
Figure 3:
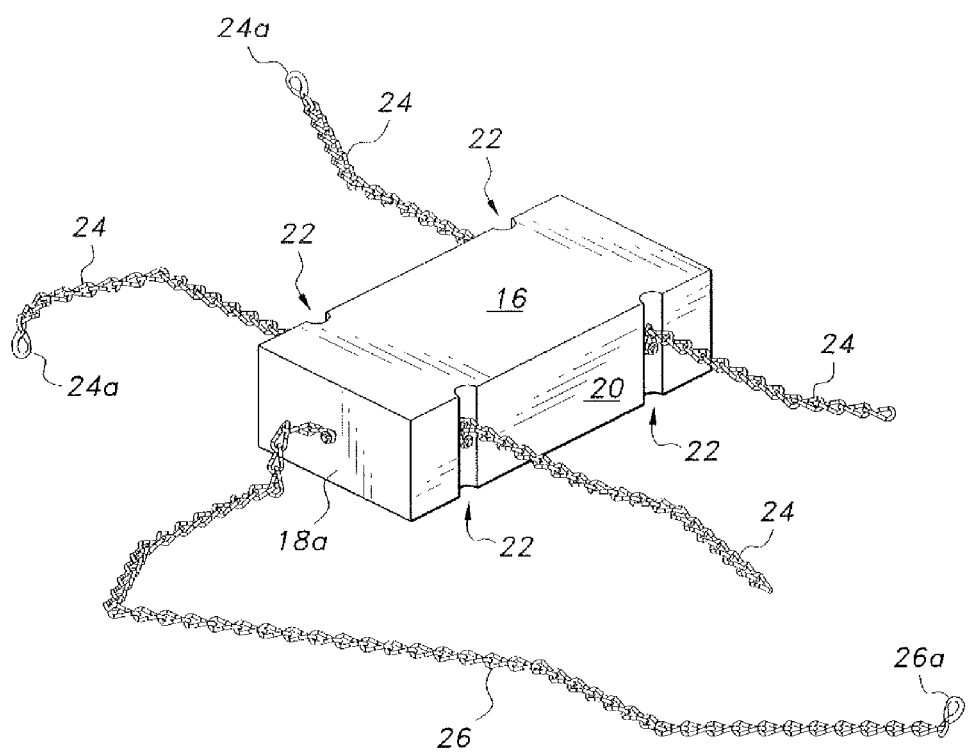
FIG. 3 is a perspective view of a trailer jack support block according to the present invention.

Referring to FIGS. 1-3, the trailer jack support block 10 is utilized to support the jack 12 of trailer hitch 14 above the ground. The block 10 is configured as a solid, rectangular parallelepiped having top and bottom faces 16, 16a, end faces 18, 18a and side faces 20, 20a. A pair of identically configured grooves 22, whose purpose is discussed below, is disposed in each of the side faces 20, 20a. The grooves 22 are coextensive with the height of the side faces. Respective chains 24 have ends anchored in a respective groove. One end face 18a has a tail chain 26 anchored thereto. The block 10 may be fabricated from any suitable material, such as wood, plastic, synthetic rubber, etc.

In use, the block 10 is adapted to be oriented so that the jack 12 may be supported on the top 16, bottom 16a, or side faces 20, 20a. This permits the jack 12 to be supported at one of two elevations, as desired. If one of the side faces 20, 20a is selected as the support surface, the other side face will contact the ground. In this instance the chains 24 are positioned in the grooves 22 of the ground-contacting face to present a level ground-contacting surface and enhance stability. Exemplary dimensions of the block 10 are 16" long, 8" wide and 12" wide. It should be noted, however, that the block 10 may be made with different dimensions, if desired.

When not in use to support the jack 12, the chains 24 are used to attach and secure the block 10 to the frame of hitch 14 (see FIG. 2). Conventional connector clips 24a are provided on the free ends of chains 24 to effect the attachment. The tail chain 26 is also provided with a connector clip 26a and is adapted to be permanently attached to the frame of hitch 14. This scenario prevents the block 10 from being inadvertently left behind.

It is to be understood that the present invention is not limited to the embodiments described above, but encompasses any and all embodiments within the scope of the following claims.

I claim:

1. A trailer jack support block for supporting a jack of a trailer hitch, comprising:
   a solid rectangular, parallelepiped member having a top face, a bottom face, two end faces and two side faces, the side faces having a height, each of the side faces having two grooves defined therein extending across the side face so that the grooves are coextensive with the height of the side face; wherein said block is configured to support a trailer hitch thereon;
   a tail chain anchored to one of the end faces, the tail chain having a free end adapted for attachment to the trailer hitch;
   a connector clip attached to the free end of the tail chain a plurality of chains anchored to each of the two side faces, each of the grooves having one of the chains anchored therein, the chain fitting in the groove when the side face lies on the ground so that the side face presents a level surface wherein said plurality of chains each having a terminal end affixed within each said groove by a fixing member.

2. The trailer jack support block according to claim 1, wherein each said chain of the plurality of chains has a free end and a connector clip attached to the respective free end, the clips being adapted for attaching said parallelepiped member to the trailer hitch.

* * * * *